(12) United States Patent
Trivette (10) Patent No.: US 9,273,902 B2
(45) Date of Patent: Mar. 1, 2016

(54) DEHUMIDIFYING CURING OVEN WITH ROTATING TRAYS

(76) Inventor: Roger Blaine Trivette, Boiling Springs, SC (US)

( * ) Notice: Subject to any disclaimer, the term of this patent is extended or adjusted under 35 U.S.C. 154(b) by 587 days.

(21) Appl. No.: 13/548,869

(22) Filed: Jul. 13, 2012

(65) Prior Publication Data

US 2014/0013719 A1    Jan. 16, 2014

(51) Int. Cl.
| | |
|---|---|
| *F26B 11/18* | (2006.01) |
| *F26B 21/08* | (2006.01) |
| *F26B 21/10* | (2006.01) |
| *F26B 21/12* | (2006.01) |
| *F26B 25/12* | (2006.01) |
| *F27D 3/00* | (2006.01) |
| *F27B 17/00* | (2006.01) |
| *A21B 1/46* | (2006.01) |

(52) U.S. Cl.
CPC ............... *F26B 11/18* (2013.01); *F26B 21/08* (2013.01); *F26B 21/10* (2013.01); *F26B 21/12* (2013.01); *F26B 25/12* (2013.01); *F27B 17/0016* (2013.01); *F27D 3/00* (2013.01); *A21B 1/46* (2013.01)

(58) Field of Classification Search
CPC ............ F26B 11/18; F26B 21/08; A21B 1/46
USPC ......... 432/125, 141, 136, 142, 128, 131, 124; 414/149, 150, 153
See application file for complete search history.

(56) References Cited

U.S. PATENT DOCUMENTS

| | | | | |
|---|---|---|---|---|
| 564,074 | A | * | 7/1896 | Hitchner .................... 432/65 |
| 3,074,360 | A | * | 1/1963 | Vaughan .................... 432/141 |
| 3,940,860 | A | * | 3/1976 | Unterreiner ................ 34/535 |
| 4,694,180 | A | | 9/1987 | Salisbury et al. |
| 4,717,339 | A | | 1/1988 | Kersting |
| 5,704,278 | A | * | 1/1998 | Cross ........................ 99/427 |
| 6,200,122 | B1 | * | 3/2001 | Chun et al. ................ 425/136 |
| 6,305,930 | B1 | * | 10/2001 | Fedak ........................ 432/125 |
| 6,856,862 | B1 | * | 2/2005 | Feltner ...................... 700/245 |
| 2008/0174048 | A1 | * | 7/2008 | Boyd et al. ................ 264/328.11 |
| 2012/0102780 | A1 | * | 5/2012 | Bruischat .................. 34/475 |

* cited by examiner

*Primary Examiner* — Alissa Tompkins
*Assistant Examiner* — Benjamin W Johnson
(74) *Attorney, Agent, or Firm* — Southeast IP Group, LLC; Thomas L. Moses (57) ABSTRACT

A curing oven includes a set of pivoting, rotating trays within a curing chamber. The trays are attached to a mechanism that rotates the trays through a curing cycle, and the speed and timing of the rotation may be set by an operator, as desired. In a preferred embodiment, the oven includes a plurality of heating elements, a commercial dehumidifier, a recirculating fan and system, temperature and humidity sensors, and a series of pivoting trays attached to a motorized rotational assembly. The oven is controlled by a various controllers, which may be programmed to set the temperature, humidity levels, rotation speed and cycle time, and other aspects of oven operation. A loading and unloading chamber is effectively sealed off from the curing chamber within the oven, preventing or reducing a transfer of air between the curing chamber and the ambient air outside of the oven.

19 Claims, 10 Drawing Sheets

DEHUMIDIFYING CURING OVEN WITH ROTATING TRAYS

BACKGROUND OF THE INVENTION

1. Field of the Invention

The present invention relates generally to industrial ovens used to cure various products during a manufacturing process. More specifically, the present invention includes a dehumidifying oven having a series of rotating trays for carrying items to be cured. The oven includes controllers for setting temperature, speed of rotation, and humidity levels.

2. Description of the Prior Art

Many types of curing ovens exist on the market today. U.S. Pat. No. 4,694,180 discloses a curing oven for adhesive which is curable by ultraviolet radiation. The curing oven includes a housing having a curing chamber for containing an item to be cured, an access opening to the chamber, a closure member for the access opening, an ultraviolet lamp which is located above the curing chamber, a primary enclosure for the lamp which includes a top opening above the lamp and a bottom opening which is below the lamp. The bottom opening forms an opening to the curing chamber to enable ultraviolet radiation to pass from the lamp to the curing chamber and to enable a convective airflow to develop from the bottom opening to the top opening across the lamp. Means are provided for creating an airflow above the top opening for removing heated air which passes through the top opening from the convective airflow.

U.S. Pat. No. 4,717,339 is directed to a high efficiency, non polluting curing oven having an internal curing chamber comprising forward and rearward regions, bottom located forward and rearward access openings to and from the forward and rearward regions a plurality of trays for carrying material to be cured through the curing chamber, a conveyor for conveying the trays to and from the forward and rearward regions through the forward and rearward access openings, a tray moving system for lifting the trays upwardly through the forward region and for transferring the trays to and for lowering the trays downwardly through the rearward region, a burner providing heated gases in a combustion chamber above the curing chamber and a fan for blowing the heated gases downwardly into the curing chamber for curing of the material with the heated gases rising back upwardly, creating a negative pressure to draw a supply of fresh outside air into the curing chamber, through the bottom located access.

U.S. Pat. No. 6,305,930 describes a vertical multiple stage oven including a first plurality of ovens in a vertical arrangement, and a second plurality of ovens in a vertical arrangement positioned adjacent the first plurality of ovens. An access port is provided to the first plurality of ovens and an exit port is provided from the second plurality of ovens. A coupling port couples the first plurality of ovens to the second plurality of ovens. A continuous pathway is defined through the first plurality of ovens and through the second plurality of ovens from the access port, through the coupling port to the exit port. Each oven is sealed from adjacent ovens by trays moving along the pathway.

U.S. Pat. No. 6,408,842 is directed to an oven including single or multiple decks of longitudinal burners extending from an infeed end to an outfeed end of a body. The burners are slanted relative to a direction of a movable carrier such that a product traveling on the carrier will be heated continuously from one side to the other by a burner whose orientation is diagonal to the product's path of travel. The proportion of air and gas may be separately controlled for each deck. Furthermore, each burner may be individually controlled and monitored to maintain a desired temperature within the body. Latitudinal pilot runners extend across the width of the oven to ignite and maintain the longitudinal burners. Infrared burners above the top deck initially heat a product to either seal in or eliminate moisture. The invention further comprises a method for heating a product.

One problem associated with these existing curing ovens is that the curing chamber is generally exposed to outside, ambient air when items are placed into the oven or removed therefrom, which causes fluctuations in temperature and humidity levels. These temperature and humidity fluctuations may cause items to be cured at inconsistent levels, causing flaws and deficiencies in the cured products. Further, in order to compensate for the escape of heat through the openings to the curing chamber, the heating elements are forced to utilize more energy in order to maintain a constant temperature within the curing chamber, thus causing increased energy costs through inefficient energy usage. Additionally, there are safety issues associated with many of these ovens. For instance, many existing curing ovens do not have safety features in place to reduce or eliminate pinch points, burns, or other types of injuries. Thus, there is a need to provide a curing oven that overcomes many of the disadvantages associated with existing curing ovens.

BRIEF SUMMARY OF THE INVENTION

In accordance with one aspect of the invention, a dehumidifying curing oven is provided. The oven includes a set of pivoting, rotating trays within a curing chamber. The trays are attached to a mechanism that rotates the trays through a curing cycle, and the speed and timing of the rotation may be set by an operator, as desired. In a preferred embodiment, the oven includes a plurality of heating elements, a commercial dehumidifier, a recirculating fan and system, temperature and humidity sensors, and a series of pivoting trays attached to a motorized rotational assembly. The oven temperature is controlled by a PID controller. The humidity level is controlled by a separate controller connected to a humidistat. A control cabinet includes other controls for the rotation of the trays and the speed of the recirculation fan.

The oven includes a heating duct, which runs vertically down the inside of the outer housing on either side thereof. Heating elements are disposed within the heating duct, and the recirculation fan, positioned on an upper portion of the oven, draws air from the curing chamber and blows the air through the heating duct, across the heating elements, and through openings in the bottom of the heating ducts into the curing chamber adjacent the bottom of the curing chamber.

An opening is provided on the front of the oven, and the opening provides access to a loading and unloading chamber. The loading chamber is substantially sealed off from the rest of the curing chamber during normal operation. The trays are spaced apart from one another in an exact manner, so that one tray is positioned at an upper portion of the opening, and another tray is positioned at a bottom portion of the opening. A rear vertical wall forms the rear boundary of the loading chamber. In this way, when the door to the opening is in the opened position, the loading chamber is defined by a tray thereabove and a tray therebelow, where the trays are substantially sealed in the front against the frame of the opening, and the trays also are in contact (or at least close proximity) with the rear wall. This arrangement prevents the heated air from the curing chamber from escaping through the opening, which allows the oven to maintain the temperature and humidity levels in a more consistent and energy efficient manner.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention includes, in a first embodiment, a curing oven 10 with a series of rotating trays 12 for curing items, for instance, in a manufacturing process. The curing oven 10 includes a base member 14 having a frame member 16 attached thereto, which carries a tray rotation assembly. An outer housing 20 is attached to the frame member 16, and the outer housing 20 includes an opening 22 on a front portion thereof, which provides access to a loading and unloading chamber 24, as well as a service door 26 on the rear side of the outer housing 20, which may be used for maintenance and repair. Inside the outer housing 20 is a curing chamber 28, where trays 12 rotate through a timed curing cycle in climate controlled environment within the curing chamber 28 at a set temperature or temperature range, and optionally, where humidity levels may be set and maintained for the curing operation.

The curing oven 10, in a preferred embodiment, also includes ductwork for recirculating air throughout the curing chamber 28. Air ducts 30 are disposed in an inverted U shape above the top of the outer housing 20 within the oven 10, and downwardly along the vertical sides of the curing chamber 28 on an inner portion thereof, as shown in FIGS. 1-6. Heating elements 32 are disposed within the air ducts 30. A variable speed recirculation fan 34 is positioned, in a preferred embodiment, on a top side of the outer housing 20, and draws air from the curing chamber 28, through an intake. The air is then blown down the air ducts 30, which causes the air to pass over the heating elements 32. Each air duct 30 has a series of openings 36 at a bottom portion thereof, and the heated air passes out of the air duct openings 36 and back into the curing chamber 28 at the bottom of the air duct 30. Thus, the air flows upwardly through the curing chamber 28 and downwardly through the air ducts 30 during a curing operation.

A series of pivoting, rotating trays 12 are attached to a rotating mechanism within the curing chamber. In one preferred embodiment, a motor 46 drives a rotating mechanism, which functions similarly to a ferris wheel, so that an operator may load items to be cured into one tray 12 (similarly to ferris wheel passengers), which is in the loading position adjacent the loading and unloading opening 24 located on the front of the outer housing 20, and then the trays 12 rotate until the next tray 12 is in the loading position. After all of the trays 12 have been filled, the operator begins to remove a cured item that has progressed through the curing cycle and replace it with a new, uncured item (similarly to ferris wheel passengers disembarking before new passengers board).

Figure 1:
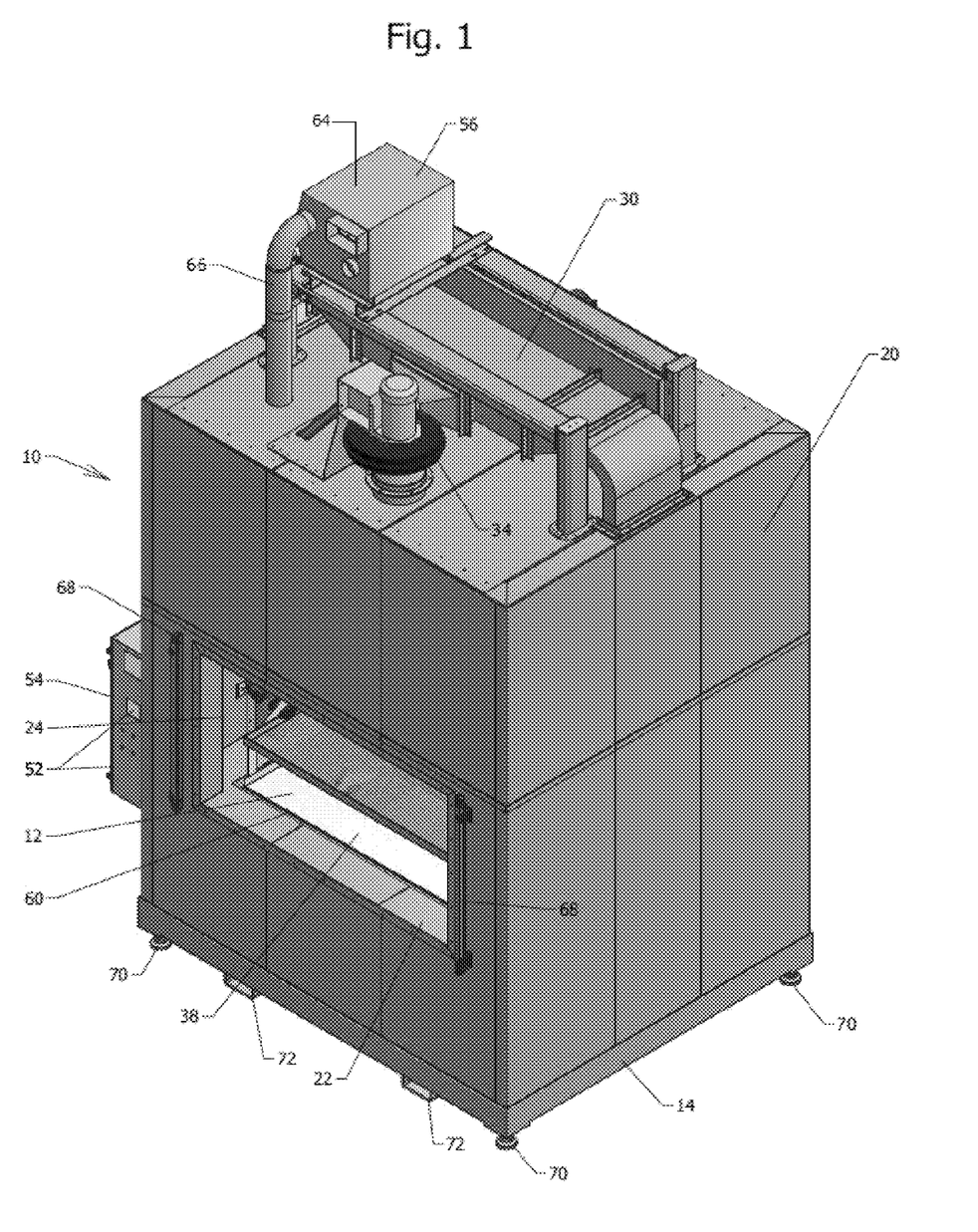
FIG. 1 is a perspective view of one embodiment of a curing oven in accordance with the present invention.
Figure 2:
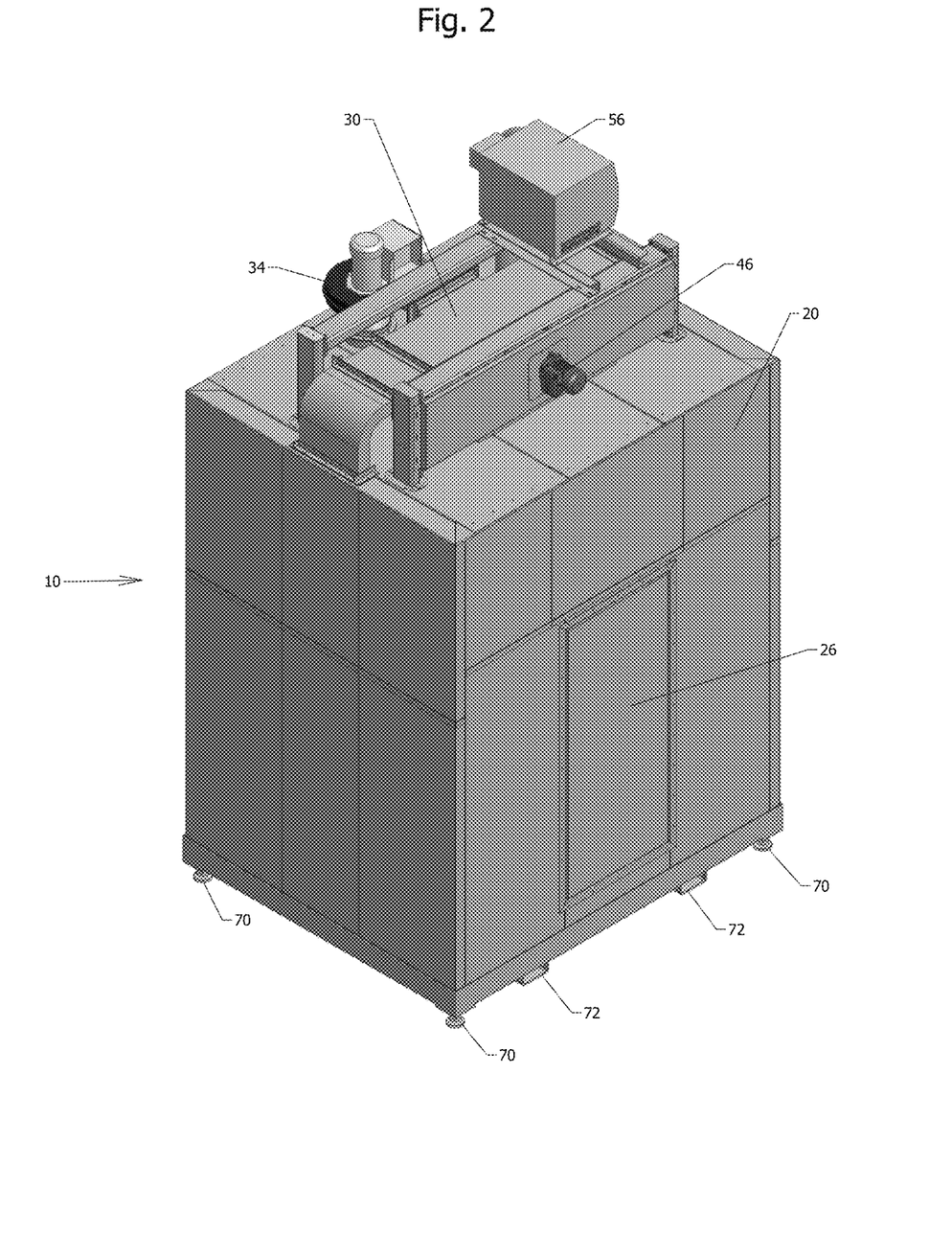
FIG. 2 is a perspective view of one embodiment of a curing oven in accordance with the present invention.
Figure 3:
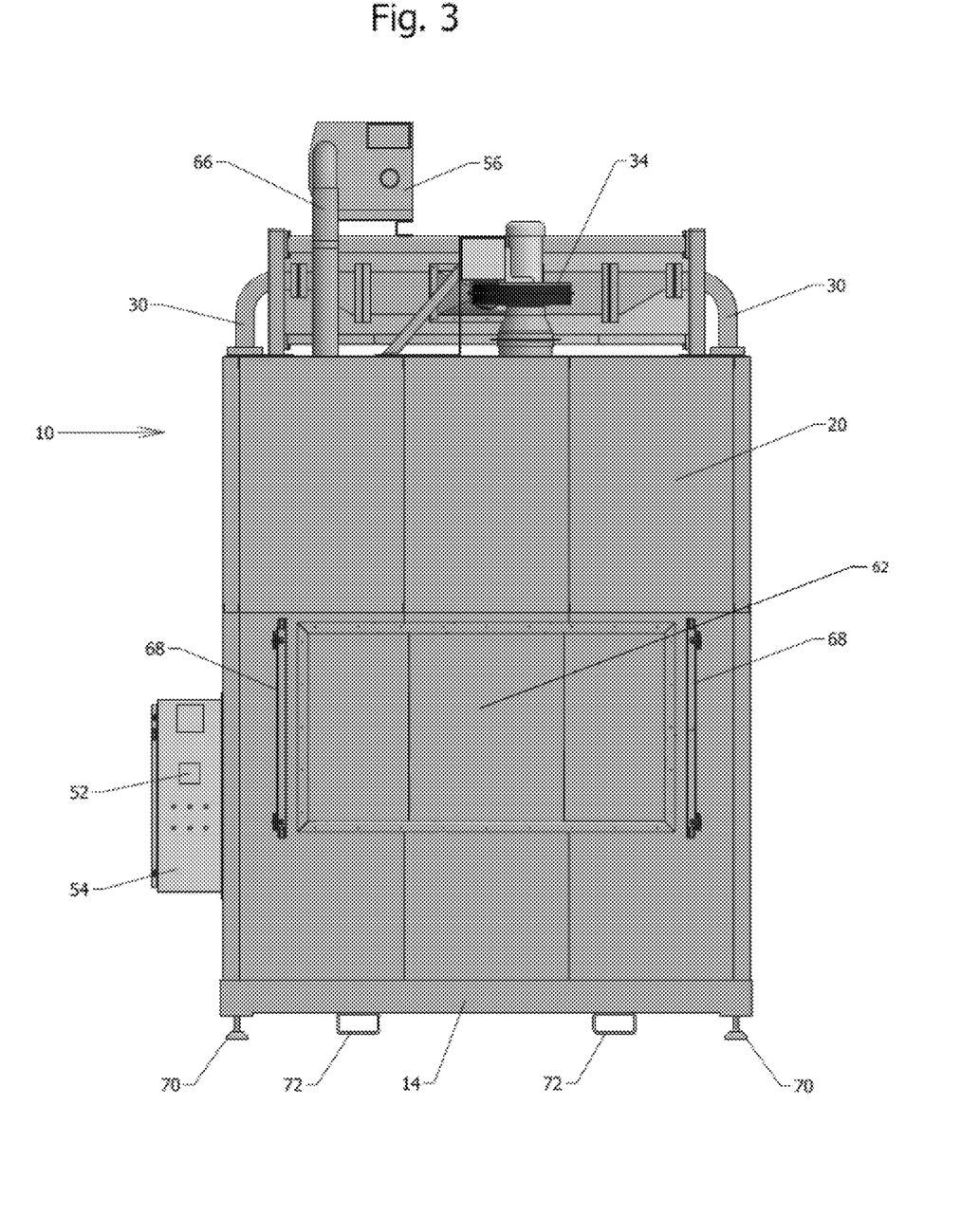
FIG. 3 is a front view of one embodiment of a curing oven in accordance with the present invention.
Figure 4:
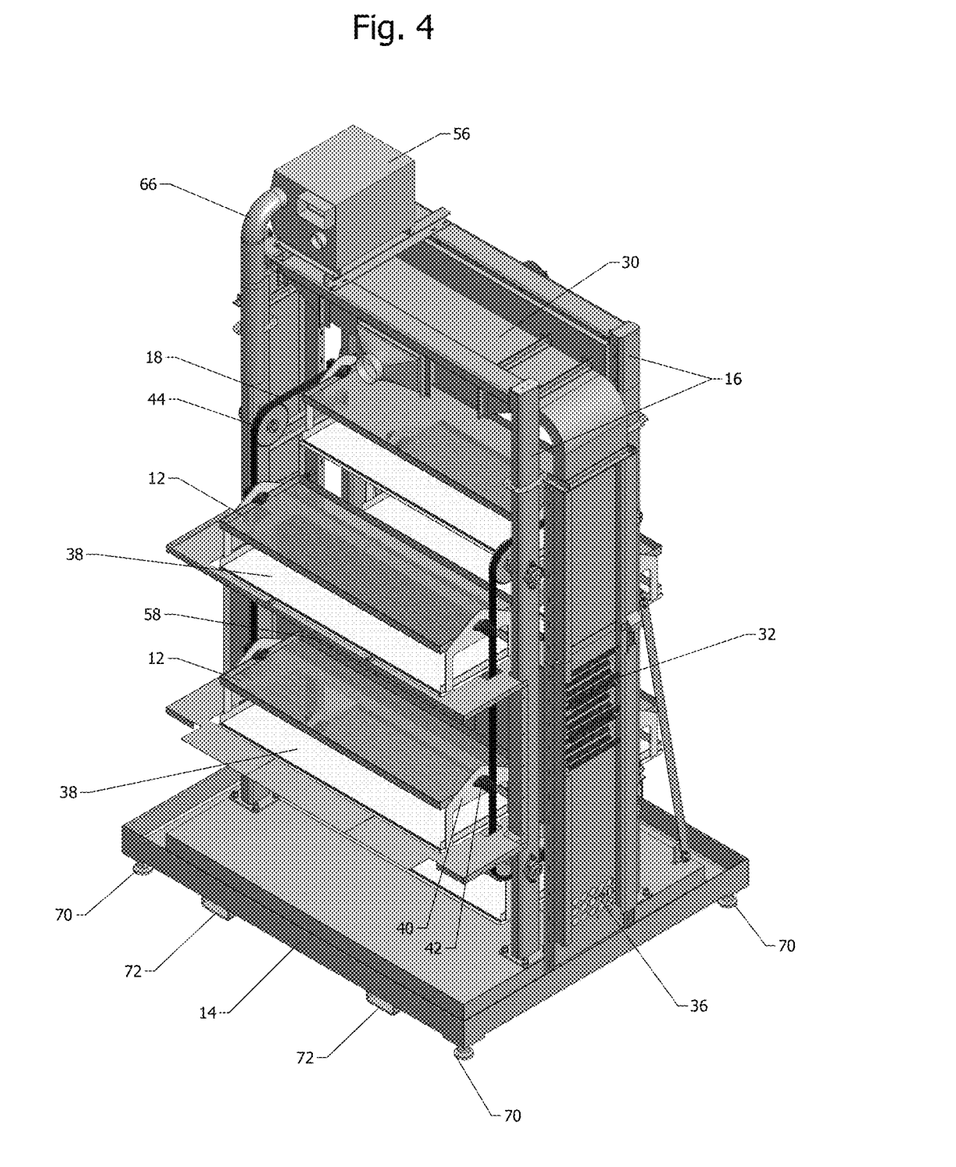
FIG. 4 is a perspective view of one embodiment of an inner portion of a curing oven, including an inner frame, tray rotation assembly, and recirculation assembly in accordance with the present invention.
Figure 5:
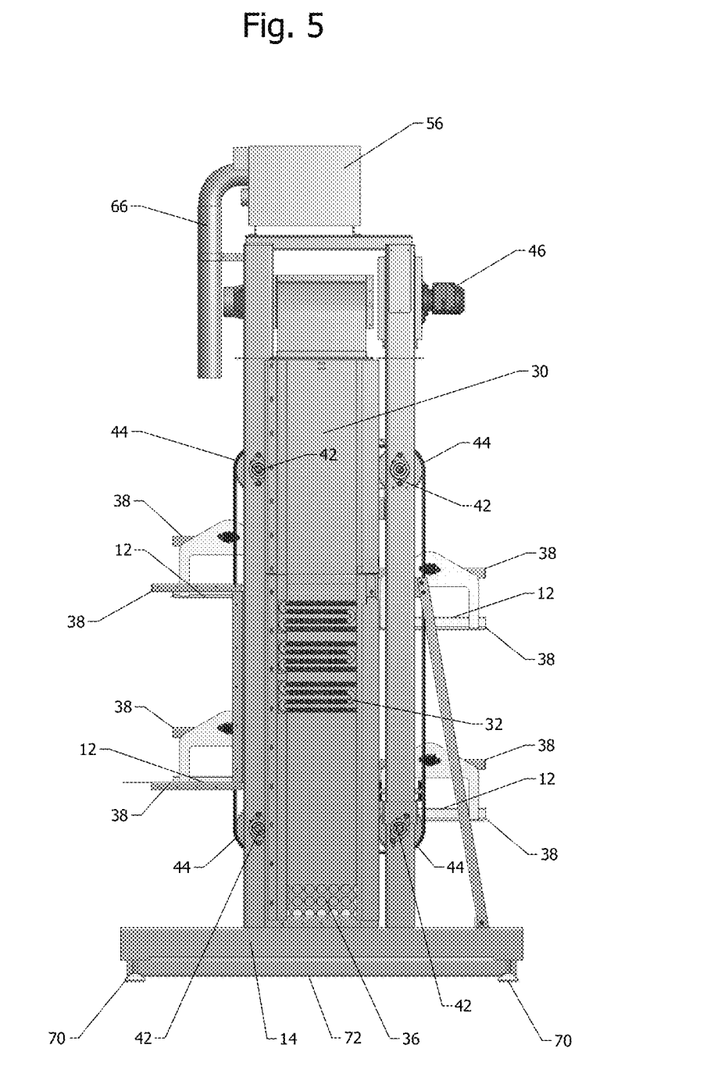
FIG. 5 is a side view of one embodiment of an inner portion of a curing oven, including an inner frame, tray rotation assembly, and recirculation assembly in accordance with the present invention.
Figure 6:
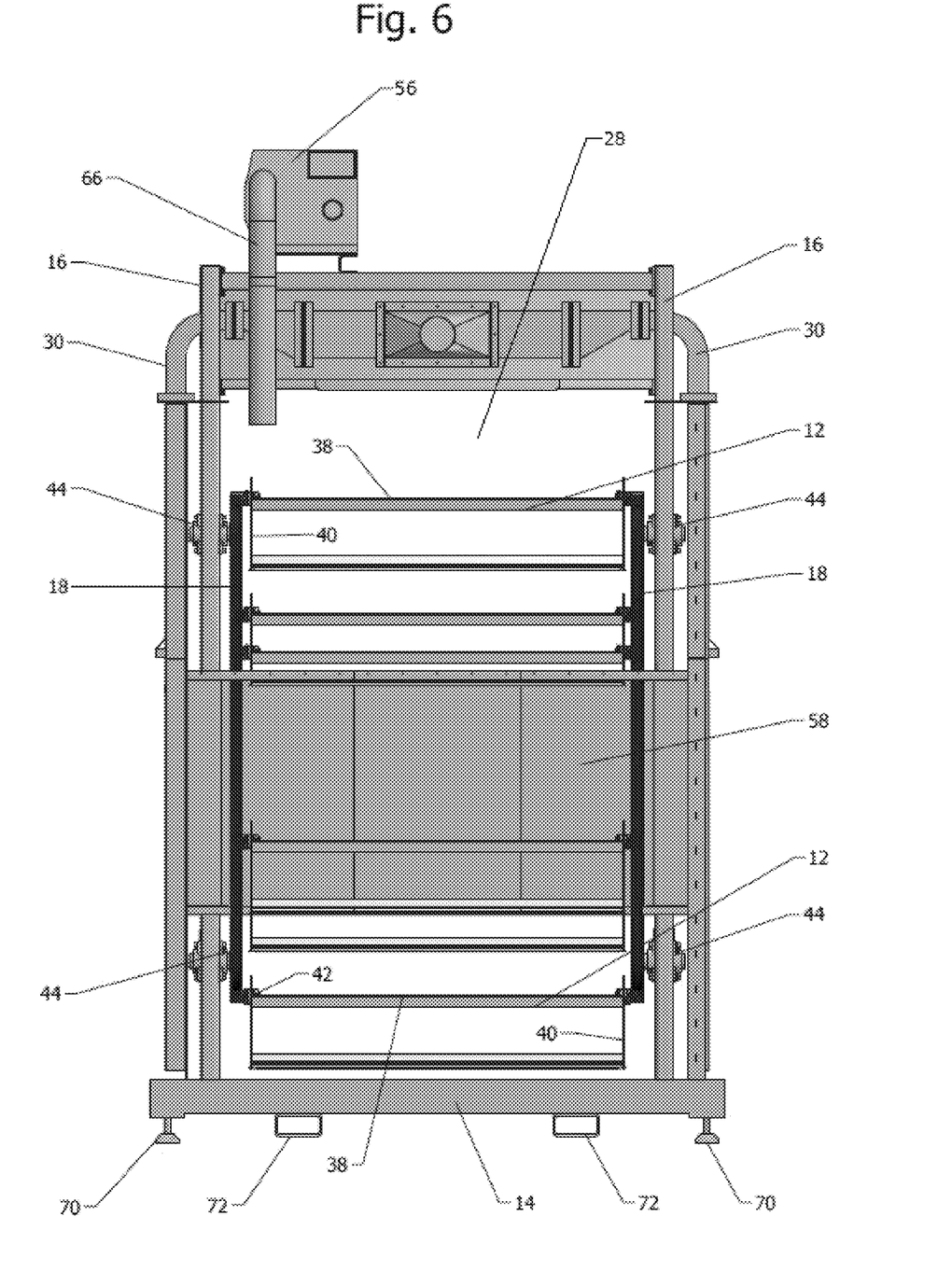
FIG. 6 is a front view of one embodiment of an inner portion of a curing oven, including an inner frame, tray rotation assembly, and recirculation assembly in accordance with the present invention.
Figure 7:
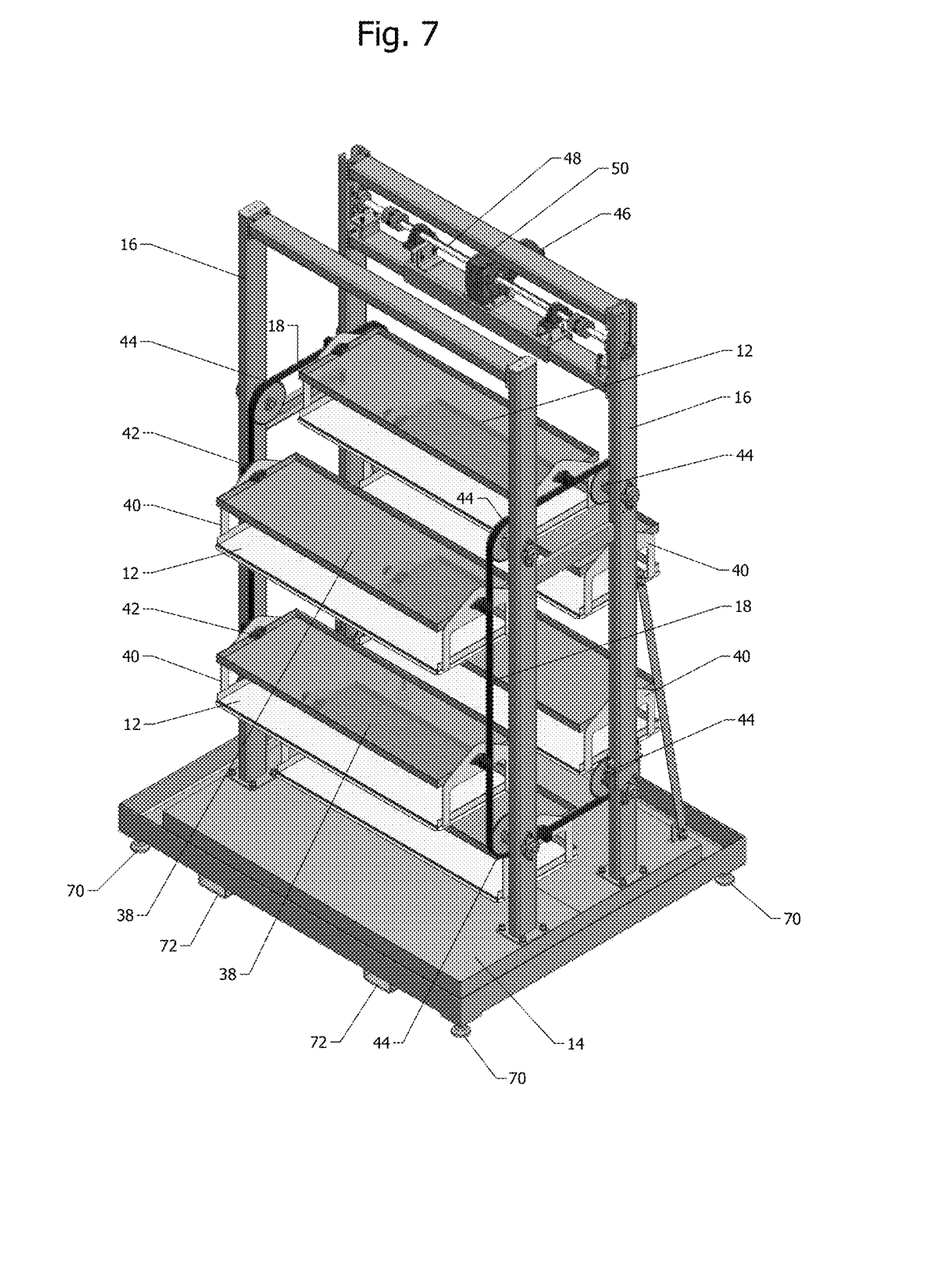
FIG. 7 is a perspective view of one embodiment of an inner portion of a curing oven, including an inner frame and tray rotation assembly in accordance with the present invention.
Figure 8:
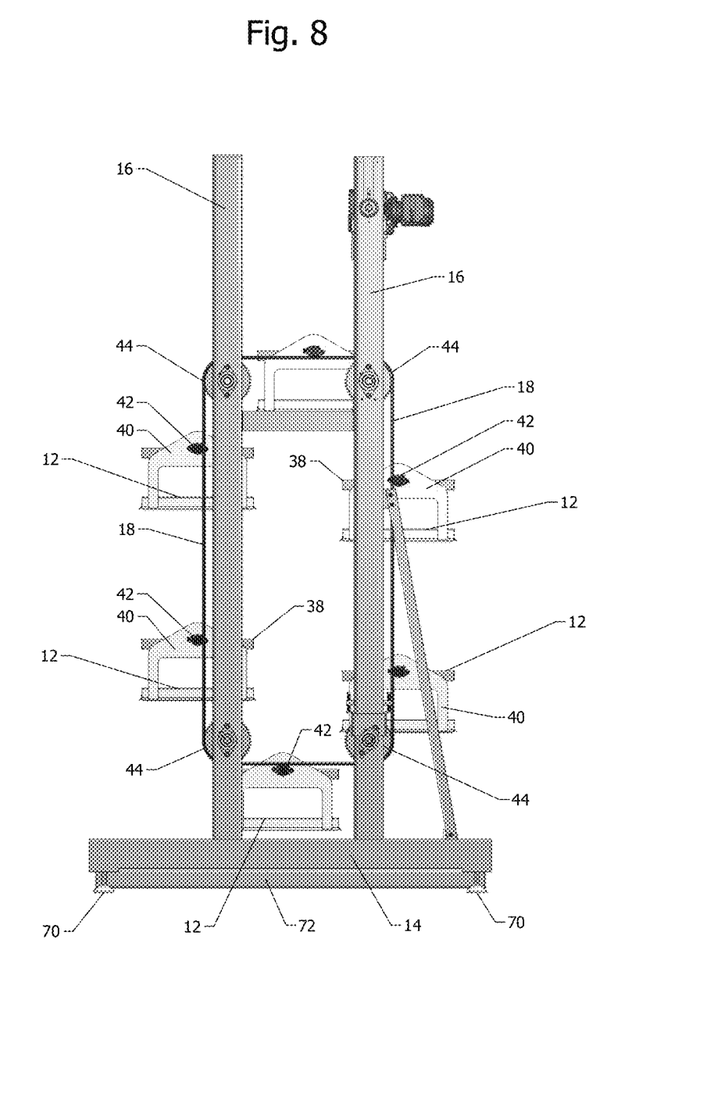
FIG. 8 is a side view of one embodiment of an inner portion of a curing oven, including an inner frame and tray rotation assembly in accordance with the present invention.
Figure 9:
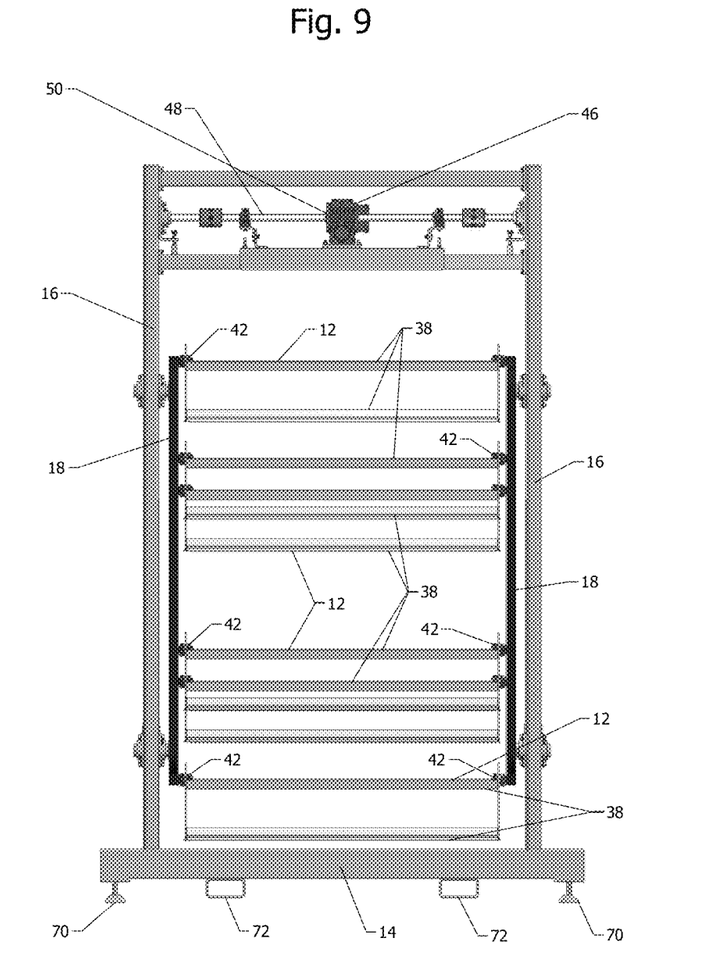
FIG. 9 is a front view of one embodiment of an inner portion of a curing oven, including an inner frame and tray rotation assembly in accordance with the present invention.
Figure 10:
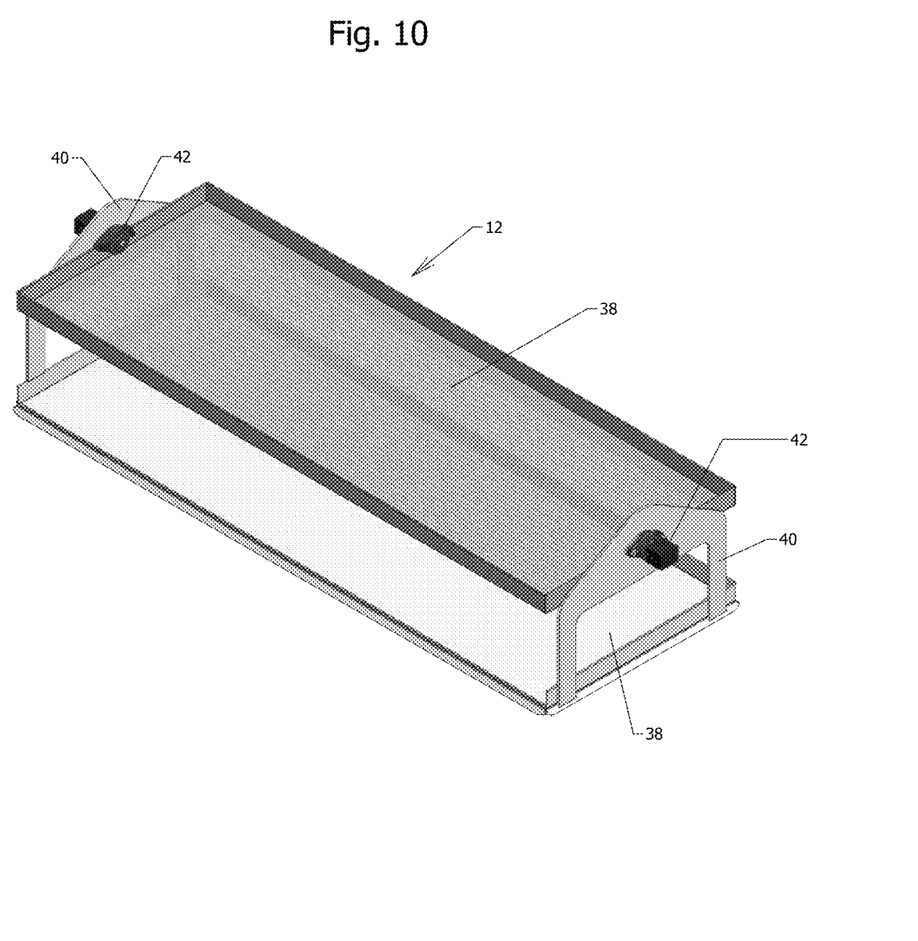
FIG. 10 is a perspective view of a tray assembly in accordance with the present invention.

Each tray 12 includes a generally flat platform 38 having a pair of supports 40 on either end extending upwardly from the platform 38, and optionally, each tray 12 may include two platforms 38, as shown in FIG. 10. Each support 40 includes a pivoting attachment or swivel 42, which allows for attachment to a rotating mechanism, preferably in the form of an endless loop, such as a belt, or more preferably, a drive chain 18. In order to maintain an even weight distribution, there are preferably an even number of trays 12 attached to the drive chain 18.

This arrangement allows the trays 12 to swivel about the point of attachment to the drive chain 18, so that each tray 12 may be maintained in a generally horizontal disposition throughout the rotation of the drive chain 18 during a curing operation. Additionally, because the trays 12 may swivel with respect to the rotating mechanism or drive chain 18, pinch points are eliminated, so that if a worker's fingers or hands are inadvertently positioned between the opening 22 in the outer housing 20 and a tray 12 in motion, the tray 12 will simply swing slightly backward instead of pinching the workers fingers or hands between the tray 12 and the lip of the opening 22.

In a preferred embodiment, the rotating mechanism is in the form of a pair of drive chains 18, which are operatively connected to a series of sprockets 44 on either side of the curing chamber 28, as shown. Preferably, there are four sprockets 44 that are rotationally attached to the frame member 16 on each side, so that each drive chain 18 forms the general shape of a rectangle or square, as shown in FIGS. 4-9. A motor 46 is attached to a drive shaft 48, which is operatively connected to the rotating mechanism and drives the assembly to rotate the trays 12 through the curing chamber during a curing cycle or process. The drive train for the rotating mechanism may include a gearbox combination 50, and the motor 46 used for rotation of the rotating assembly is preferably a variable speed electric motor.

A PID (Proportional Integral Derivative) controller 52, in a preferred embodiment, is operatively connected to an SCR (Silicone Control Rectifier), which controls the heating element(s) 32. An operator may set a target temperature or a temperature range within the curing chamber 28, which is monitored by a heat sensor or thermostat positioned therein (not shown). The SCR (not shown) is used to control the amount of power supplied to the heating element(s) 32, which is determined by the temperature level and the temperature setting designated by the operator.

Separate controls, located on the control panel 54, are used to operate the motor 46, and may be programmed to rotate the drive chains 18 in order to position the next tray 12 in the rotation for loading and unloading. The controls are preferably positioned on a control panel 54, which may be affixed to the outside of the outer housing 20. The motor controls may be programmed to automatically rotate the trays 12 from one position to the next based on time increments, or the timing of the cycle may be determined and set in motion manually by the operator. Other controls may also be used to control other functions of the oven, including the fan speed of the recirculation fan, as well as the dehumidifier, among other functions as desired.

The loading and unloading chamber 24 is substantially sealed off from the rest of the curing chamber 28 during normal operation. The trays 12 are spaced apart from one another in an exact manner, so that one tray 12 is positioned at an upper portion of the opening 22, and another tray 12 is positioned at a bottom portion of the opening 22. Additionally, the trays 12 are spaced apart so as not to come into contact with, or interfere with, one another during the rotation operation. A rear vertical wall 58, attached to the frame member 16 inside of the curing chamber 28, forms the rear boundary of the loading and unloading chamber 24. A sealing strip 60, preferably a flexible strip of PVC, may be placed along a top lip and bottom lip of the opening 22 to the loading and unloading chamber 24. These sealing strips 60 come into contact with the front edges of the top tray 12 and bottom tray 12 with respect to the opening 22 when the trays 12 are in the loading and unloading position. The opening 22 also includes a door 62, which may be opened during loading and unloading, but which may be closed during the rotation of the trays 12 in order to maintain the integrity of the curing chamber, so that heated air does not escape from the curing chamber 28 during a curing process. In this way, when the door 62 to the opening 22 is in the opened position, the loading and unloading chamber 24 is defined by a tray 12 thereabove and a tray 12 therebelow, where the trays 12 are sealed in the front by the sealing strips 60 of the opening 22, and the trays 12 also are in contact with (or are at least reasonably close to) the rear wall 58.

This arrangement prevents the heated air from the curing chamber 28 from escaping through the opening 22, which allows the oven 10 to maintain the temperature and humidity levels in a more consistent and energy efficient manner. It is also contemplated that the curing oven 10 may be slightly pressurized by a fan (not shown) within the dehumidifier 56 (or alternatively, through other means), so that the air pressure within the curing chamber 28 is slightly higher than the ambient air pressure outside the oven 10. Thus, if there is a transfer of air between the curing chamber 28 and the environment outside, the air flows outwardly from the curing chamber 28, rather than into the curing chamber 28, which helps to maintain a constant temperature and humidity level therein. The loading and unloading chamber 24 acts similarly to an air lock used on submarines or space craft, which provides a substantially sealed buffer between the inside and outside of the structure.

Optionally, a dehumidifier 56 may be integrated into the curing oven 10. The dehumidifier 56 is operatively connected to, or includes, a humidistat 64, which measures humidity levels within the curing chamber. The dehumidifier 56 may be set at any desired humidity level, and runs only as necessary to maintain a constant humidity level, based on readings from the humidistat 64. The dehumidifier 56 is, in a preferred embodiment, positioned on a top portion of the outer housing 20, or on top of the recirculation air duct 30, as shown in FIGS. 1-6. The dehumidifier 56 takes in ambient air from outside the oven 10 or curing chamber 28 and blows the dry or dehumidified air into the curing chamber 28 through a pipe 66.

As a safety feature, a light curtain 68 may be affixed adjacent the opening 22 for loading and unloading, and the light curtain 68 senses when an object, such as a worker's hand or arm, breaks the plane of the opening 22. If an object does break the plane of the opening 22, then the light curtain 68 prevents the motor 46 from rotating the trays 12 within the curing chamber 28.

The base member 14 may include threaded leveling feet 70, which are adjustable in order to maintain the oven 10 in a level position. The base member 14 may also include fork lift runners 72 on an underside thereof, so that a forklift may be used to pick up and move the oven 10, when desired.

In use, the various controllers may be programmed or used to set the temperature, humidity level, circulation fan speed, and cycle time for the tray rotation assembly. An operator opens the door 62 to the opening 22, providing access to the loading and unloading chamber 24. The operator then unloads a cured item and replaces it with an uncured item. If the minimum cycle time for an uncured item is 18 minutes, and there are six trays 12 in the assembly, then the trays 12 are programmed to rotate from one position to the next every three minutes. Alternatively, the tray rotation may be operated manually, so that when an operator closes the door 62 to the opening 22 after a loading and unloading cycle, he or she presses a button to rotate the trays 12 to the next position. When the trays 12 are rotated, the tray 12 that has just been loaded with a new, uncured item, moves either upwardly or downwardly to the next position, and the following tray 12 is positioned for unloading and loading.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A curing oven comprising:
   a generally flat base member;
   a frame member attached to and carried by said base member;
   a rotating mechanism carried by said frame member;
   a motor for driving said rotating mechanism;
   a series of trays pivotally attached to said rotating mechanism;
   an outer housing carried by said base member, said outer housing including an opening on a front side thereof for loading and unloading items on said trays;
   a door attached to said opening, so that said door may be closed or open in order to provide access to said trays;
   said outer housing defining a curing chamber therein;
   a rear wall attached to said frame member;
   a loading and unloading chamber adjacent said opening on an inside portion of said outer housing, said loading and unloading chamber defined by said door, said rear wall, vertical walls of said outer housing, and an upper tray and a lower tray, when said trays are in a loading and unloading position;

said trays being able to pivot within said loading and unloading chamber;

at least one air duct attached to said outer housing for recirculating air within said curing chamber, said air duct having a portion positioned downwardly along said vertical walls within said curing chamber and an opening on one end within said curing chamber;

at least one heating element disposed within a portion of said air duct within said curing chamber; and a recirculation fan operatively attached to said air duct for blowing air therethrough and into said curing chamber, for maintaining a uniform temperature throughout the curing chamber.

2. The curing oven set forth in claim 1, further comprising a controller operatively connected to said heating element for controlling said heating element.

3. The curing oven set forth in claim 1, further comprising a controller operatively connected to said motor for controlling said motor.

4. The curing oven set forth in claim 1, further comprising a controller operatively connected to said recirculation fan for controlling said recirculation fan.

5. The curing oven set forth in claim 1, further comprising a dehumidifier operatively connected to said curing chamber for maintaining consistent humidity levels within said curing chamber.

6. The curing oven set forth in claim 1, further comprising a light curtain disposed adjacent said opening on an outer portion of said outer housing, said light curtain operatively connected to said motor.

7. The curing oven set forth in claim 1, wherein each said tray includes at least two generally flat platforms for receiving and carrying items.

8. The curing oven set forth in claim 1, further comprising a rear service opening disposed within a rear side of said outer housing, and further including a rear service door that provides access to said rear service opening.

9. The curing oven set forth in claim 1, wherein said base member includes a plurality of threaded leveling feet disposed on an underside thereof.

10. The curing oven set forth in claim 1, wherein said base member includes at least two fork lift runners disposed on an underside thereof.

11. The curing oven set forth in claim 1, wherein said rotating mechanism includes a pair of drive chains, each drive chain attached to a series of rotating sprockets attached to said frame member, wherein said drive chains are disposed on opposed sides of said trays.

12. A curing oven comprising:
a generally flat base member affixed to and carrying an outer housing, said outer housing and said base member defining and encompassing a curing chamber therein;

said outer housing defining an opening on a flout portion thereof;

an inner flame member attached to and carried by said base member within said curing chamber;

a rotating mechanism carried by said flame member;

a series of trays pivotally attached to said rotating mechanism within said curing chamber;

a motor operatively attached to said rotating mechanism so that said motor drives said rotating mechanism;

a loading and unloading chamber positioned within said outer housing adjacent said opening, wherein said loading and unloading chamber is substantially sealed off within said curing chamber during loading and unloading operations;

said trays being able to pivot within said loading and unloading chamber;

at least one heating element disposed on an inner portion of said outer housing for maintaining a uniform temperature throughout said curing chamber; and an air duct operatively connected to said curing chamber for recirculating air within said curing chamber wherein said air duct has a portion positioned downwardly along vertical walls of said outer housing within said curing chamber.

13. The curing oven set forth in claim 12, further comprising a dehumidifier operatively connected to said curing chamber for maintaining consistent humidity levels within said curing chamber.

14. The curing oven set forth in claim 12, further comprising a recirculation fan operatively connected to said air duct.

15. The curing oven set forth in claim 12, wherein said rotating mechanism includes a pair of drive chains, each drive chain attached to a series of rotating sprockets attached to said frame member, wherein said drive chains are disposed on opposed sides of said trays.

16. The curing oven set forth in claim 12, further comprising a controller operatively connected to said heating element for controlling said heating element.

17. The curing oven set forth in claim 12, further comprising a controller operatively connected to said motor for controlling said motor.

18. The curing oven set forth in claim 14, further comprising a controller operatively connected to said recirculation fan for controlling said recirculation fan.

19. The curing oven set forth in claim 13, further comprising a controller operatively connected to said dehumidifier for controlling said dehumidifier.

* * * * *

UNITED STATES PATENT AND TRADEMARK OFFICE
CERTIFICATE OF CORRECTION

PATENT NO. : 9,273,902 B2
APPLICATION NO. : 13/548869
DATED : March 1, 2016
INVENTOR(S) : Roger Blaine Trivette It is certified that error appears in the above-identified patent and that said Letters Patent is hereby corrected as shown below:

Claims

In Column 8 on Line 5 (Claim 12, Line 5), the term "flout" should be changed to --front--; Line 7 & 9 (Claim 12, Lines 7 and 9), the term "flame" should be changed to --frame--.

Signed and Sealed this
Third Day of May, 2016

Michelle K. Lee
*Director of the United States Patent and Trademark Office*